United States Patent [19]

Rivera

[11] Patent Number: 5,314,040
[45] Date of Patent: May 24, 1994

[54] AUTOMOBILE ANTI-THEFT DEVICE

[76] Inventor: Jose C. Rivera, 216 S. Dakota, Laredo, Tex. 78041

[21] Appl. No.: 847,786

[22] Filed: Mar. 5, 1992

[51] Int. Cl.$^5$ .............................. B60R 25/00
[52] U.S. Cl. ................................ 180/287; 70/237
[58] Field of Search ............... 180/287; 70/237, 56.1; 40/593

[56] References Cited

U.S. PATENT DOCUMENTS

| | | | |
|---|---|---|---|
| 1,455,812 | 5/1923 | Schafer | 70/237 |
| 1,533,007 | 4/1925 | Kammerer | 70/237 |
| 1,550,917 | 8/1925 | Mindermann | 70/237 |
| 1,569,868 | 1/1926 | Loeb | 70/237 |
| 4,075,879 | 2/1978 | Christopher | 70/337 |
| 4,762,198 | 8/1988 | Vagnone et al. | 180/90 |
| 4,790,406 | 12/1988 | Ferrell et al. | 180/287 |

FOREIGN PATENT DOCUMENTS 2215688  9/1989  United Kingdom ............... 180/287

Primary Examiner—Margaret A. Focarino
Assistant Examiner—Paul Dickson
Attorney, Agent, or Firm—Gunn, Lee & Miller

[57] ABSTRACT

A passive anti-theft device (10) for use with a landborne vehicle (14) which alerts the observing public that vehicle (14) has been stolen. The device consists of a broad, flat, brightly colored, message lettered strap (16) that normally stows between the trailing edge of the cowl (32) and the lower edge of the outer surface of the automobile windshield (12). When the vehicle (14) is left unattended, the strap (16) articulates pivotally from the windshield (12) lower edge to rotate upward at a removed end. The strap (16) is lockingly secured (28) to the windshield (12) along a diagonal. Thus, a thief must either remove the strap (16)—which would require breaking the windshield—or drive the car with the strap (16) in plain sight, its lettered message (30) alerting the public of the unauthorized use of the auto (14).

4 Claims, 5 Drawing Sheets

AUTOMOBILE ANTI-THEFT DEVICE

FIELD OF THE INVENTION

The present invention relates to an automobile anti-theft device and, more particularly, to a strap or bar which in a stowed position lays at the base of the outer (or inner) surface of the windshield of the automobile, between the trailing edge of the cowl and the windshield, and in a use position, stretches diagonally across to the upper edge of the windshield, the strap or bar carrying a message advising the public of the unauthorized use of the vehicle.

BACKGROUND

The theft of automobiles is one of the most serious property crimes in the United States today. The loss to the economy of such thefts is estimated to be in the hundreds of millions of dollars per year. Insurance premiums, already high, have skyrocketed as a result of such thefts. Recently, many devices have been developed to help prevent the theft of automobiles. Those devices may be generally classified as active or passive. An active device is one which disables a system in the car, normally required to drive the vehicle. Such active systems are known which disable steering columns, fuels systems, transmissions and drive train systems, as well as steering wheels themselves.

One such anti-theft device may be found in U.S. Pat. No. 4,790,406 which discloses an anti-theft device for an automobile comprising a stainless steel shield permanently fixed to the shift bowl of the steering column of an automobile. When assembled on a steering column, the shield moves with the shift bowl when the gear shift is moved. A lock assembly with a dead bolt is provided on the defender shield with the dead bolt mounted for radial movement with respect to the shield. When the car is in a parked position, the dead bolt enters the gate of the shift device at a position such that the gear lever cannot be moved out of the parked position.

Another such device is disclosed in U.S. Pat. No. 4,762,198 which discloses a vehicle anti-theft system having an auxiliary switch that is interposed in the ignition controlling the circuit between the main key switch and the ignition starting unit. The auxiliary switch is formed with a normally opened, single pole, single break context located behind and spaced from the outer surface of the vehicle wall and access to the contacts is through a single, small diameter entrance tube, which functions also to mount the switch behind the vehicle wall.

Other systems are in the nature of passive devices. These do not disable the vehicle. These include audio alarms which alert anyone within listening range that there has been an unauthorized tampering with the lock systems or otherwise unauthorized entry into the vehicle. However, the audio alarm systems are often easily disabled by the thief. In addition, such alarm systems are frequently ignored as they are often inadvertently activated, such as by innocent passers-by.

What is needed is a simple, convenient system, easily retrofitable to existing automobiles, which will be difficult to disable, and will visually alert the public to the unauthorized use of the vehicle.

SUMMARY OF THE INVENTION

The anti-theft device of the present invention is designed to prevent the theft of land-borne vehicles of the type having windows or a windshield. The device comprises a broad, flat, rigid, or flexible, durable strap or bar with an attachment means allowing the strap to normally stow behind and beneath the trailing edge of the cowling lip of the automobile or between the instrument panel and the inside of windshield and a lock means for releasably locking the removed end of the strip to a diagonal position across the face of the windshield. Thus, before the driver leaves his vehicle unattended, he lifts the removed end of the strap from its stowed position, rotates it upward across the face of the windshield to releasably attach to a locking means anchored in the windshield glass near the upper edge of the windshield. An appropriate message warning the public of the unauthorized use of the vehicle is printed across the outer surface of the strap, such as: "IF DRIVEN, THIS VEHICLE IS STOLEN!" Thus, the device of the present invention provides a simple, passive, fool-proof means of alerting the public of the theft of the vehicle.

DETAILED DESCRIPTION OF THE PREFERRED EMBODIMENT OF THE PRESENT INVENTION

Figure 1:
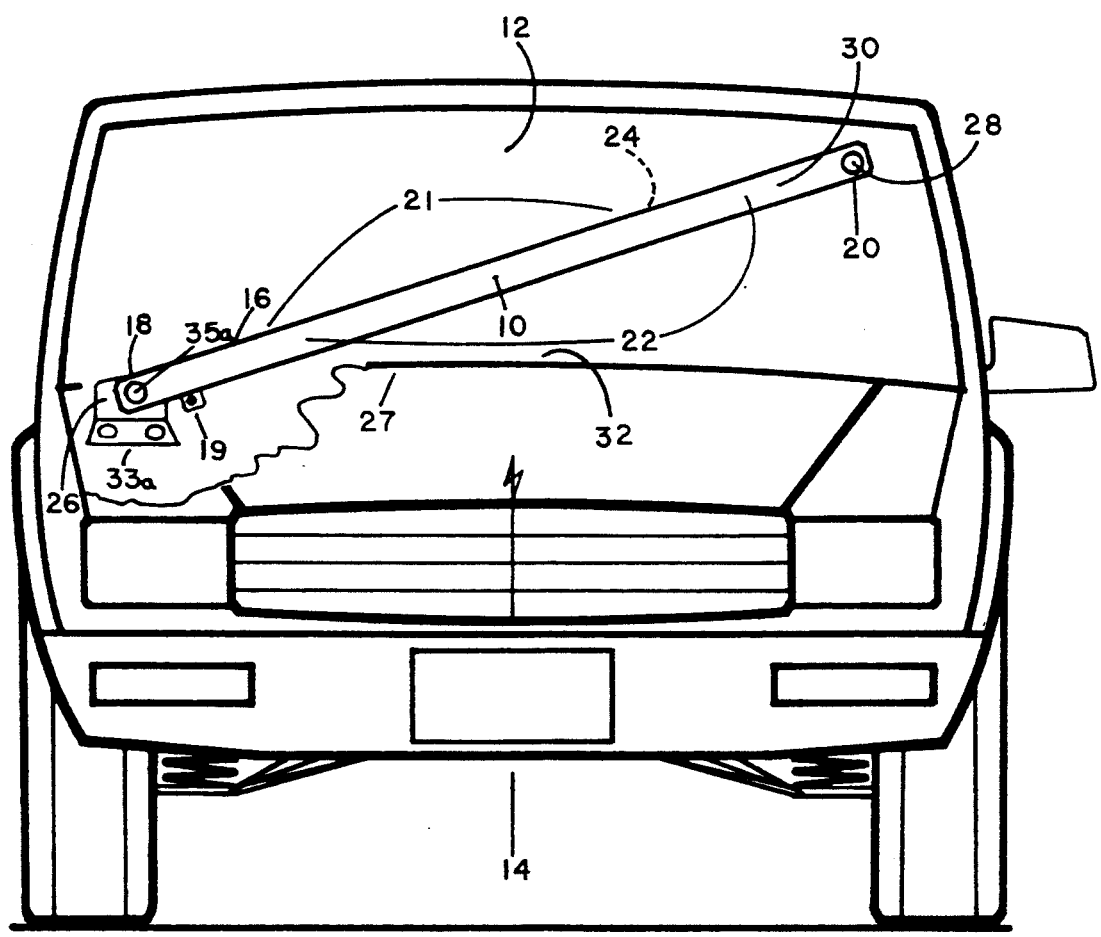
FIG. 1 is a perspective view of the strap of the anti-theft device in a use position, the vehicle being left unattended.

FIG. 1 illustrates an anti-theft device (10) of the present invention as attached to the outer or inner surface of a windshield (12) of a land-borne vehicle (14), here an automobile. Anti-theft device (10) of the present invention is comprised principally of a strap (16) having a first end (18) and a second end (20). Strap (16) has a body (21) between first end (18) and second end (20), the body (21) having an outer surface (22) visible from outside the car (14), and an inner surface (24) laying against or close to the outer surface of windshield (12) when the strap is mounted on the outside of the car. If the strap were mounted inside the car, inner surface (24) would be away from the windshield and outer surface (22) would be against or close to the windshield.

As can be seen in FIG. 1, strap (16) is attached at first end (18) to attachment means (26). Attachment means (26) is located on the body of vehicle (14) at a location along or near the lower edge of windshield (12), and behind a cowl (27). First end (18) can be attached also to the lower edge of windshield (12). In a use position, strap (16) with a message (30) on outer surface (22) stretches diagonally across windshield (12) to a lock mechanism (28), located diagonally across windshield (12) from attachment means (26) to attach to the surface of the windshield glass. The driver of vehicle (14), upon leaving the vehicle (14) unattended, will secure second end (20) to lock mechanism (28) thus alerting the public with message (30), that if vehicle (14) is being driven, such use is unauthorized.

Tongue (19) located near first end (18) provides a means to mount a cable (not shown) which will activate a number of active anti-theft devices (such as an audio alarm system or ignition disabler) when strap (16) is placed in use. Upon returning to the car (14), the driver unlocks lock mechanism (28) and pivots strap (16) to a stowed position behind trailing edge of cowl (32) or at the base of the dash board which puts message (30) substantially out of sight of the public, and does not block the driver's vision.

Strap (16) of the anti-theft device (10) should be constructed of material that is difficult to cut, preferably about ⅛ inch to ⅜ inch thick steel cables laying laterally to one another being covered by a cover. Strap (16) is painted in colors that are bright and contrast, preferably with reflective surfaces that are easily visible at night. The length of strap (16) may be custom fit or manufactured for different sized vehicles or adjustable (see FIGS. 4 and 4a). The dimensions of strap (16) are, by way of example, 4 to 8 inches wide, 40 to 60 inches long by ⅛ to ⅜ inch thick. It may fit to vehicle (14) with first end (18) either between the windshield wipers or outside of the windshield wipers or attached to the inside of the car (14) at the dashboard. Alternately, first end (18) may be pivotally attached to the glass along the lower edge of the windshield (12)—on the outside or the inside. Strap (16) should be positioned so as to prevent interference with windshield wipers while they are operating and while strap (16) is in a stowed position, and to prevent interference with vision. If vehicle (14) is of the type that does not have a space between cowl (27) and windshield (12), such space as found with cars having recess-mounted windshield wipers, attachment means (26) may be located on the outer surface of cowl (27) itself or on the lower edge of windshield (12) such as by bolting or welding bracket (33), or on the lower part of windshield (12) by drilling. Alternatively, strap (16) may pivot from nut and bolt arrangement (35a) or rivets attached directly to vehicle (14) without use of bracket (33).

Lock Mechanism

Figure 2:
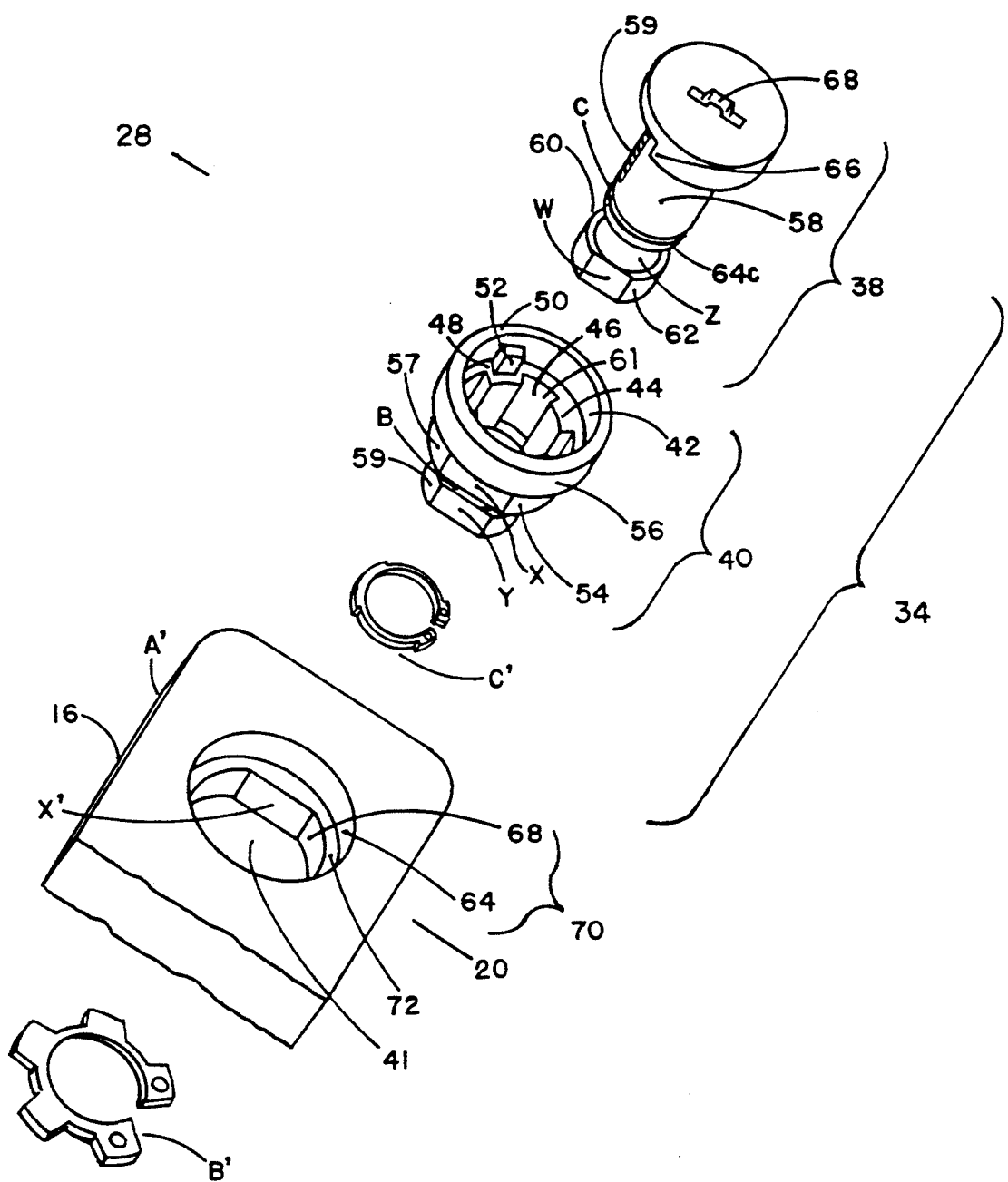
FIG. 2 is an exploded perspective view of the fixed member of the lock mechanism illustrating the two components—key plug assembly and barrel—of the fixed member and the manner in which they mount to the second end of the strap.
Figure 3:
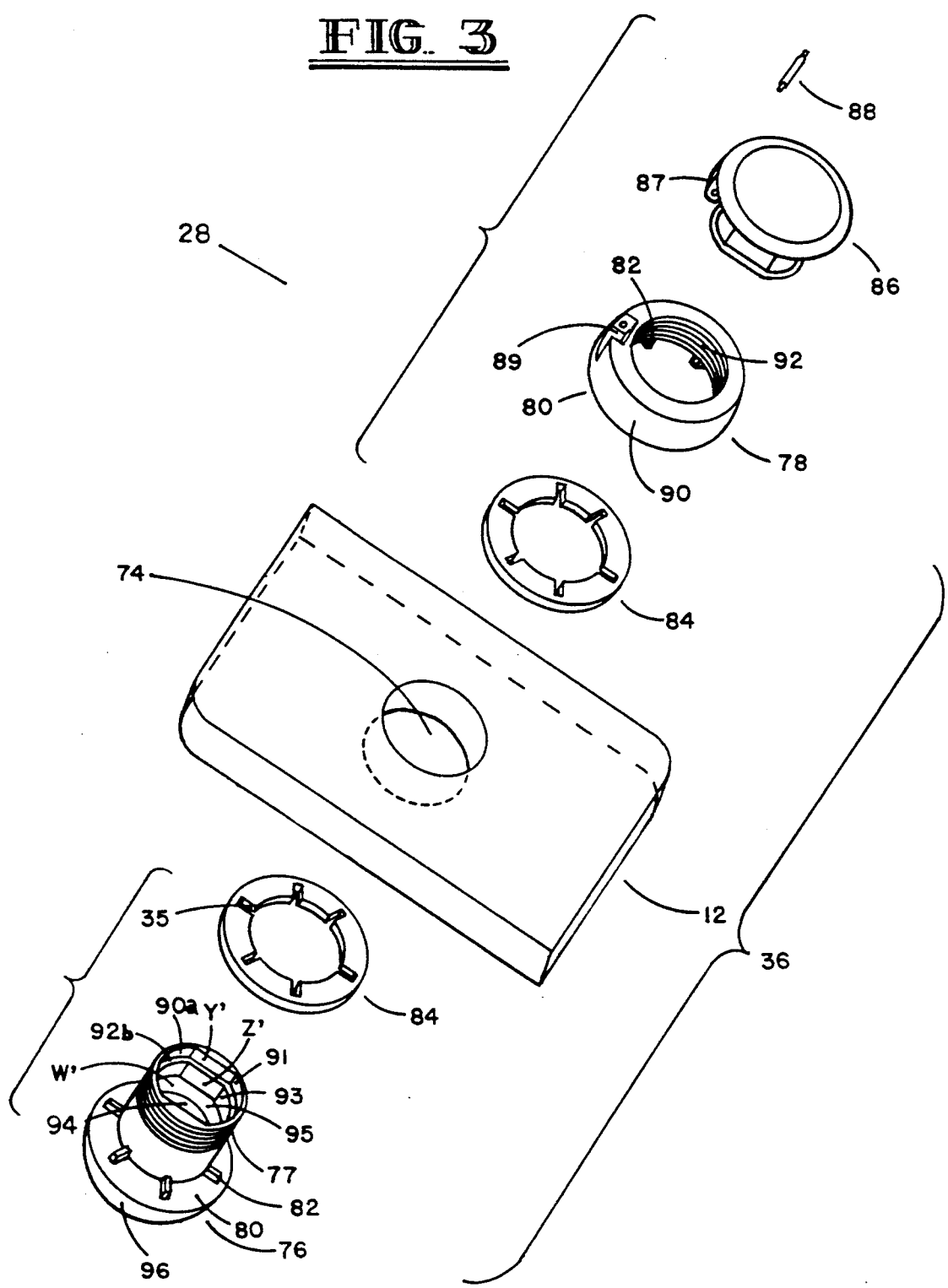
FIG. 3 is an exploded perspective view of the mounting means portion of the lock mechanism illustrating how the windshield insert provides for the receipt therein of portions of the fixed member.

Turning now to the lock mechanism of the present invention, FIGS. 2 and 3 illustrate how fixed member (34) is of the tumbler type. Specifically, FIG. 2 illustrates fixed member (34) portion of lock mechanism (28) and FIG. 3 illustrates mounting means (36) of lock mechanism (28). To assist in understanding this, the cylinder lock mechanism described in U.S. Pat. No. 4,075,879 (Christopher 1978) is incorporated herein by reference.

Lock mechanism (28) (FIG. 2) is comprised of fixed member (34) located at second end (20) of strap (16) and mounting means (36) located on windshield (12) near the upper edge thereof (FIG. 3). In FIG. 2 it can be seen that fixed member (34) is comprised of key plug assembly (38) and cylindrical, tubular, barrel (40). That is, key plug assembly (38) fits within barrel (40) of fixed member (34), then the assembly is inserted through hole (41) of strap (16). More specifically, FIG. 2 illustrates barrel (40) having forward inner walls (42). Annular shoulder (48) defines the boundary between forward inner walls (42) and rear inner walls (61). Rear walls (61) includes longitudinally extending lands (44) which are separated by bays (46) circumferentially located along rear walls (61). Forward of annular shoulder (48) is forward wall surface (50).

Barrel (40) has outer walls (54) which define at a forward section forward ring (56) and at a rear section groove B separating alignment members (57) and (59), the former having a larger diameter than the later. As can be seen in FIG. 2, outer walls (54) of barrel (40) have alignment members (57) and (59) which shaped with planar sections (X) and (Y) thereon.

Key plug assembly (38) is comprised of forward outer walls (58) and rear outer walls (60). Forward outer walls (58) contain retractable tumblers (59) actuated by key (not shown) through key slot (68) in a manner more fully set forth in the Christopher patent. Rear outer walls (60) contain groove (C), lip (64c), groove (Z), and member (62) which contains flat portion (W) thereon.

Turning now to second end (20) of strap (16), it is seen that hole (41) has walls (64) and (68) defining inner surface (70). Walls (64) and (68) are separated by ledge (72). Wall (68) has flat portion (X') thereon.

Thus it can be seen in FIG. 2 how fixed member (34) is comprised of key plug assembly (38) which is dimensioned to be received within barrel (40) such that tumblers (59) in an expanded key withdrawn position are located within one of the bays (46) thereby preventing rotation of key plug assembly (38). Stop boss (52) provides stop means on which shoulder (66) comes to rest when key plug assembly (38), with key inserted, is rotated within forward inner wall (42). This channel is defined by forward wall surface (50). Key plug assembly (38) fits within barrel (40) held in place by C-clip (C') which fits in groove (C). Fixed member (34) is then inserted into hole (41) where flat portion (X) mates securely against flat portion (X'). The entire assembly being held to strap (16) by C-clip (B') which fits in groove (B). Thus, strap (16) has attached to the removed end thereof a key insertable fixed member (34) with lip (64c), groove (Z) and member (62) which contains flat portion (W) projecting from the rear surface thereof.

Turning now to FIG. 3, we see illustrated mounting means (36) into which the rearward extending portion of key plug assembly (38) (see FIG. 2), defined as rear outer walls (60) (see FIG. 2), fits lockingly through hole (94) to affix strap (16) to windshield (12). Mounting means (36) is comprised of windshield insert (76) which is dimensioned to fit snugly within hole (74) with threaded member (77) extending through the outer surface of windshield (12) to receive insert nut (78) thereon. Rubber washers (84) help define a flush fit. As can be seen in FIG. 3, rubber washers (84) contain radially cut slots (35) through which ribs (82) of windshield insert (76) in walls (80) thereof, may project, such that ribs (82) and insert nut (78) lie flush against the surface of windshield (12). Ribs (82) are designed to shatter windshield (12) if mounting means (36) is tampered with.

As can be further appreciated from FIG. 3, hinged cap (86) has hinged member (87) which contains hinge pin receiving means for hinge pin (88) therethrough.

Hinge member (87) is located within hinge recess (89) at insert nut outer surface (90). The function of hinge cap (86) is to prevent air, water, debris, etc. from coming through hole (94) while the car is in motion and strap (16) is in stowed position. Hinge cap (87) is rotated away from its closed position as illustrated on FIG. 3 when cylinder (40) is inserted into windshield insert (76). Thus, it can be seen in FIG. 3 how windshield insert (76) is securely fixed to windshield (12) with insert nut (78) with threaded member (77) matched to threads (92) on the inner surface of insert nut (78) so as to provide a means for receipt of rear outer walls (60) of key plug assembly (38) and end of barrel (40).

Inner walls (90a) of windshield insert (76) contain first wall (91), second wall (93) and third wall (95). First wall (91) has flat portions (Y') and is generally circumferential with flat portions (Y') disposed 180° on either side of first wall (91). Ledge (92b) separates first wall (91) from second wall (93). Second wall (93) is constructed similar to first wall (91), except it has a slightly smaller radius. Thus, second wall (93) has flat portions (Z') disposed adjacent to flat portions (Y'). Rearward of inner walls (90a) is third wall (95) which contains no flat portions, just a uniform wall circumferentially defining channel (W'). When key plug assembly (38) is inserted through mounting means (36), flat portion (Y) will fit flush with inner wall portion (Y') of windshield insert (76).

Flat portion (Y') will mate with flat portion (Y) of barrel (40), thus preventing rotation of fixed member (34) with respect to mounting means (36). When properly positioned, key plug assembly (38) with member (62) and flat portion (W) will slide by flat portions (Y') and (Z') with C-clip (B') resting flush against outer ledge of (76) and end of barrel (40) resting flush against ledge (92b). Thus, member (62) with flat portion (W) will extend in channel (W) and when key plug is rotated, it will be impossible to withdraw key plug assembly (38) from windshield insert (76) or vice versa, unless flat portion (W) aligns with (Y') and (Z').

Thus, it can be seen how lock mechanism (28) provides for fixed member (34) insertable within mounting means (36) to locate strap (16) diagonally across windshield (12). In this manner, message (30) is conspicuously displayed to the public, thereby alerting the same to the unauthorized use of vehicle (14).

Figure 4:
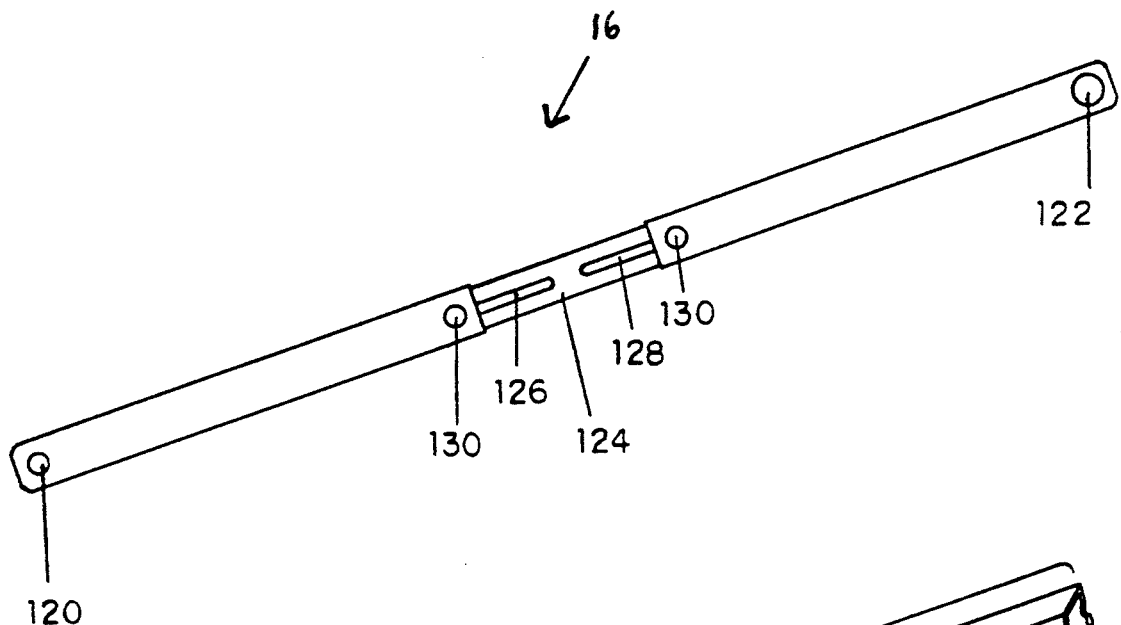
FIGS. 4 and 4a illustrate in elevational and perspective views, means to lengthen and shorten the strap so as to more easily fit a variety of vehicles.
Figure 4A:
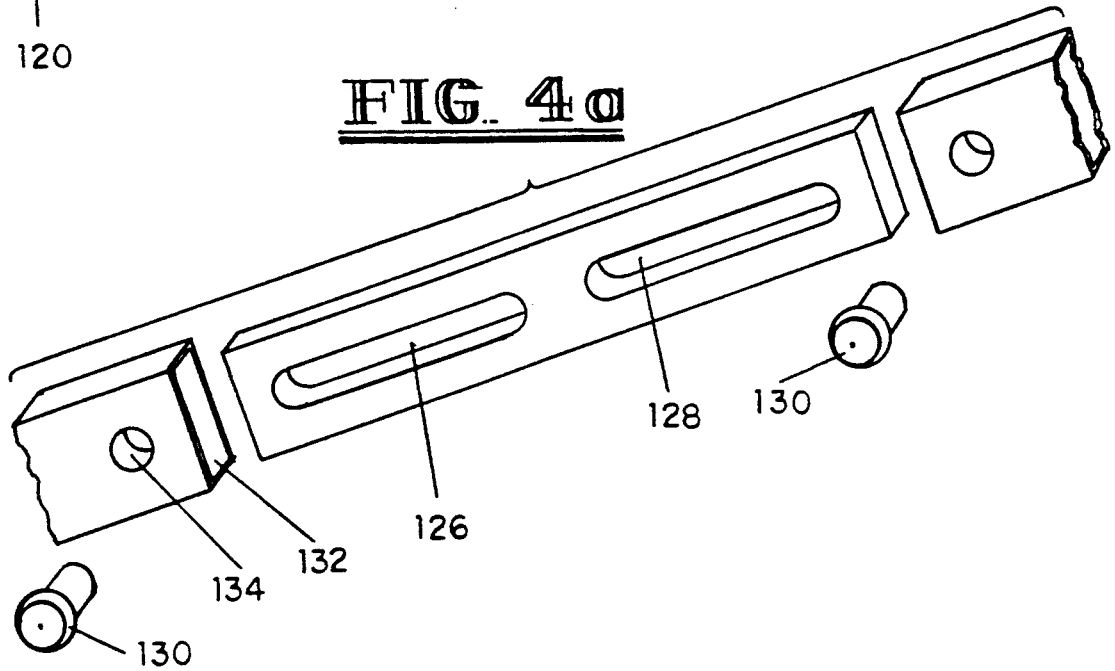

FIGS. 4 and 4a illustrate an elevational and perspective view respectively with a means to provide the ability for strap (16) to be lengthened or shortened. More specifically, FIGS. 4 and 4a illustrate strap (16) having member (124) between removed ends (120) and (122). Member (124) is provided with guide slots (126) and (128) which ride in pins (130). Pins (130) extend through bores (134) and through guide channels (126) and (128) respectively and allow member (124) to ride in channel (132) of strap (16).

Figure 5:
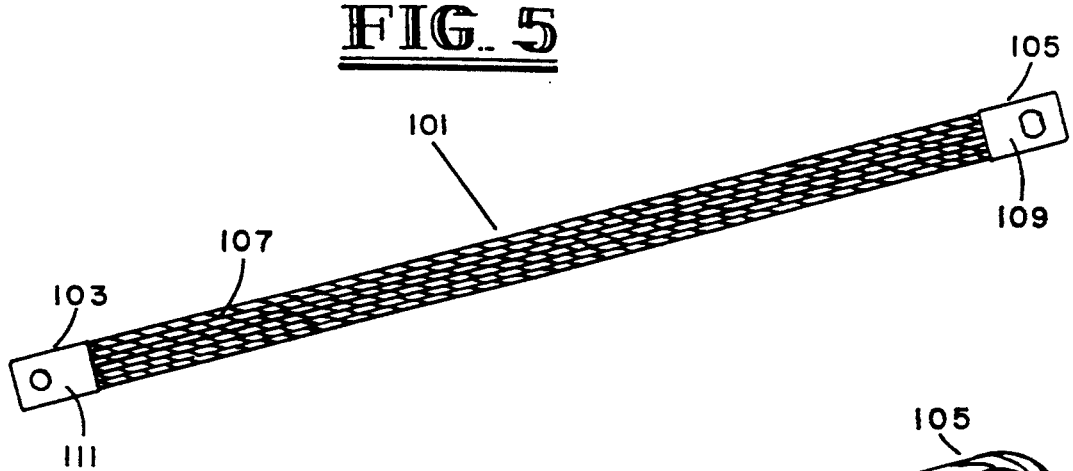
FIG. 5 illustrates in elevational view an alternate embodiment of Applicant's invention comprising a series of flexible cables.
Figure 6:
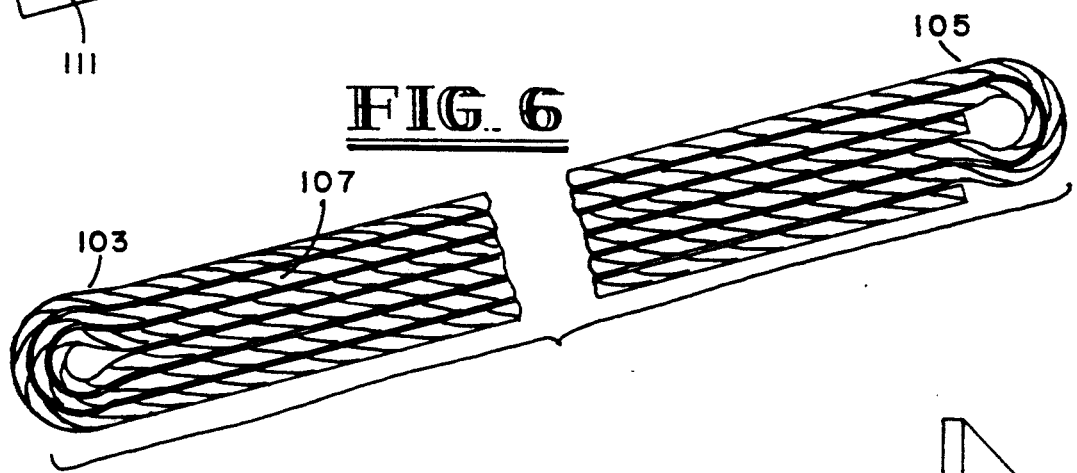
FIG. 6 illustrates in elevational view the ends of the alternate embodiment of Applicant's invention illustrated in FIG. 5.
Figure 7A:
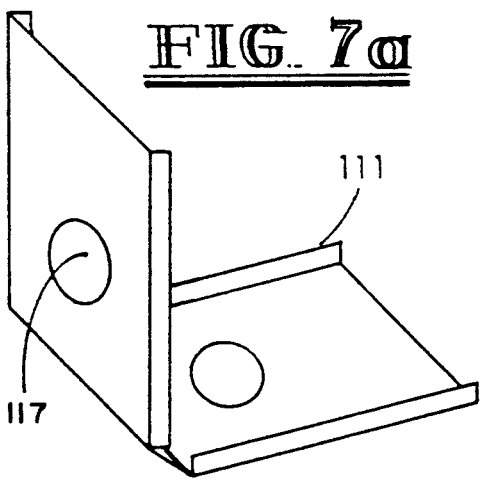
FIGS. 7a and 7b illustrate in perspective view caps for covering ends of Applicant's invention.
Figure 7B:
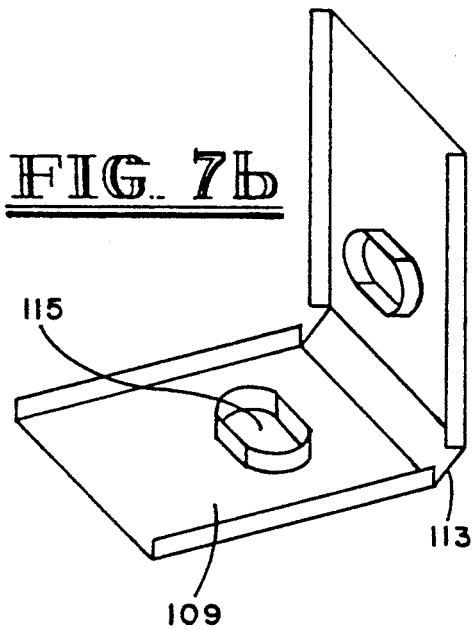

FIGS. 5, 6, 7a and 7b illustrate an alternate preferred embodiment of Applicant's invention, more particularly, strap (101) illustrates a preferred embodiment having near end (103) and removed end (105) for locking in to the window or windshield of an automobile. Strap (101) is comprised of hardened steel cable (107) with the strands laid laterally as illustrated in FIG. 5. As can be seen in FIGS. 7a and 7b, removed end (105) has "clam shell" caps (109) with hole (115) therein. Near end (103), which attaches to the automobile and from which strap (101) pivots, has cap (111) with hole (117) dimensioned to accept whatever fastening means the user desires to affix it to the automobile, as more particularly set forth in the paragraphs above.

Thus, it can be seen that the alternate preferred embodiment as illustrated in strap (101) provides a strap for laying across the window or the windshield of the automobile, which is flexible yet durable, and difficult to cut or tamper with. Of course, strap (101) may be covered, at least the uncapped portion thereof, with a bright, durable plastic or cloth envelope (not shown) which will both be aesthetically pleasing, protect the surface of the automobile and also provide a ready surface for printing indicia thereon.

It is to be understood that applicant's unique strap could be affixed to fit across any window of the automobile as, for example, the rear window instead of the front windshield of the automobile. It is to be further understood that the removed end of the strap may be fixed in a use position to the body portion of the vehicle and need not have to attach to the glass of the window, the specific locations of attachments not intended to be a limitation of the claims.

Terms such as "left," "right," "up," "down," "bottom," "top," "front," "back," "in," "out," "clockwise," "counterclockwise" and the like are applicable to the embodiment shown and described in conjunction with the drawings. These terms are merely for the purposes of description and do not necessarily apply to the position or manner in which the device may be constructed or used.

Although the invention has been described with reference to a specific embodiment, this description is not meant to be construed in a limiting sense. Various modifications of the disclosed embodiments will become apparent to those skilled in the art upon reference to the description of the invention. It is therefore contemplated that the appended claims will cover such modifications that fall within the true scope of the invention.

I claim:

1. A device to help prevent the theft of vehicles having a window thereon, the device comprising:
   a broad, flat strap, having a first end and a second end, and a body portion with an inner and outer surface thereon;
   attachment means for pivotally attaching the first end of the strap near the base of the window, and
   lock means for releasably locking the second end of said strap to the window;
   wherein the outer surface of said strap contains an appropriately worded message to alert public of the unauthorized use of the vehicle, said strap being stowable in a first position across the base of the window and visible in a second, locked position, diagonal across the face of the window; and
   wherein said lock means further comprises means for shattering the window if said lock means is forcibly tampered with.

2. A device to prevent the theft of vehicles having a window thereon, the device comprising:
   a broad, flat strap having an outer surface and an inner surface, a first end, a body portion, and a second end;
   attachment means for pivotally attaching the first end of said strap near the base of the window;
   lock means for releasably locking the second end of said strap to the window, said lock means comprising a mounting member attached to the window of the vehicle, a fixed member located on the second end of said strap for attachment to the mounting member and key means for locking and unlocking the fixed member to the mounting member and thereby fixing said strap to the window; and extensible means for increasing and decreasing the length of said strap;

wherein the outer surface of said strap contains an appropriately worded message to alert the public of the unauthorized used to the vehicle, said strap being stowable in a first position across the base of the window, the message being substantially hidden from the public and visible in a second position, with said strap laying diagonally across the surface of the window; and wherein the mounting member is comprised of a window insert having a threaded member insertable through a hole in a window for threaded engagement with an insert nut, the threaded member dimensioned to receive the fixed member therein.

3. The device of claim 2 further comprising means, flush with the surface of said window, for shattering the window if there is tampering with said lock means.

4. The device of claim 2 further comprising a cap means dimensioned to snugly fit upon the nut of said mounting means to prevent debris from entering the car.

* * * * *